United States Patent
Zamani et al.

(10) Patent No.: US 12,040,604 B2
(45) Date of Patent: Jul. 16, 2024

(54) COMPOSITE REINFORCEMENT SYSTEMS FOR POWER TRANSMISSIONLINES, AND METHODS OF FORMING SAME

(71) Applicants: Davoud Zamani, San Diego, CA (US); Talieh Zargar, San Diego, CA (US)

(72) Inventors: Davoud Zamani, San Diego, CA (US); Talieh Zargar, San Diego, CA (US)

(73) Assignee: Gridwrap, Inc., San Diego, CA (US)

( * ) Notice: Subject to any disclaimer, the term of this patent is extended or adjusted under 35 U.S.C. 154(b) by 508 days.

(21) Appl. No.: 17/366,986

(22) Filed: Jul. 2, 2021

(65) Prior Publication Data
US 2022/0029405 A1 Jan. 27, 2022

Related U.S. Application Data

(60) Provisional application No. 63/056,054, filed on Jul. 24, 2020.

(51) Int. Cl.
*H02G 7/10* (2006.01)
*H02G 15/007* (2006.01)
*H01B 9/00* (2006.01)

(52) U.S. Cl.
CPC .............. *H02G 7/10* (2013.01); *H02G 15/007* (2013.01); *H01B 9/008* (2013.01)

(58) Field of Classification Search
CPC ........ H02G 7/10; H02G 15/007; H02G 15/00; H02G 15/103; H02G 15/184; H02G 15/196; H02G 7/00; H02G 7/02; H01B 9/008; H01B 9/00; H01B 9/02; H01B 9/023
USPC ......... 174/40 R, 68.1, 260, 255, 256, 119 R, 174/110 R, 137 R, 138 R
See application file for complete search history.

(56) References Cited

U.S. PATENT DOCUMENTS

| | | | | |
|---|---|---|---|---|
| 4,018,962 A | * | 4/1977 | Pedlow | H02G 15/10 428/921 |
| 5,985,385 A | * | 11/1999 | Gottfried | F16L 59/145 428/920 |
| 7,304,245 B2 | * | 12/2007 | Alexander | H01B 3/12 174/113 R |
| 7,939,764 B2 | * | 5/2011 | Gottfried | H01B 7/29 174/121 A |
| 9,157,588 B2 | * | 10/2015 | Chen | F21S 4/15 |

* cited by examiner

Primary Examiner — Angel R Estrada
(74) Attorney, Agent, or Firm — FALATI (57) ABSTRACT

A hybrid single or multilayer composite reinforcement system is disclosed. The system is configured to install or apply around the existing power transmission lines, for example, ACSR transmission lines for increasing ampacity and also decreasing sag of the power transmission lines. The hybrid composite system comprises a first layer, a second layer, and a composite core as a structural reinforcement component. The first layer and second layer are formed using a fiber reinforced resin composite material, comprising a basalt fiber and the structural reinforcement component is a carbon fiber. The composite core is disposed between the first layer and second layer. Further, the first layer and second layer are cured, thereby making the multilayer hybrid composite reinforcement system. The composite core, comprising for example carbon fiber, provides structural strength for the hybrid composite system. The system is novel, lightweight, fast and easy to install, long-lasting, reliable, environmentally friendly, and cost-effective.

14 Claims, 6 Drawing Sheets

COMPOSITE REINFORCEMENT SYSTEMS FOR POWER TRANSMISSIONLINES, AND METHODS OF FORMING SAME

BACKGROUND OF THE INVENTION

An electrical grid, electric grid or power grid, is an interconnected network for delivering electricity from power generators to the customers. The electric grid is a complex system, which is providing safe, reliable, uninterrupted, and cost-effective electricity to the customers. The electric transmission and distribution infrastructure and energy delivery are the cornerstone of modern society.

Even though grid technology has gone through rapid changes to accommodate supply and demand needs, power transmission infrastructure has become aged and more stressed. According to the Department of Energy (DOE), 70% of transmission lines are 25 years or older. On top of aging grid infrastructure, due to increase in penetration of renewable energies, there is a need to increase the power capacity of grid lines while addressing evolving reliability and resiliency concerns. New line build or rebuild requires significant monetary and time investment and expanding power capacity (ampacity) of grid lines is challenging with inherent physical limitations of existing steel cable cores.

Thermal constraints limit the capability of a transmission lines to carry more power because the resistance created by the movement of electrons causes heat to be produced. Overheating can lead to two possible problems. The transmission lines lose their strength, which could reduce the expected life of the lines, and also expand and sag between the supporting towers. This presents safety issues as the transmission lines approach the ground, as well as reliability concerns.

If a transmission line comes in contact with the ground, trees, or other objects, it will trip off-line and not be able to supply power. For more than a century, the steel core has been used as a reinforcement core. Increasing the need to expand the transmission capacity (ampacity) of the grid requires a significant cost and it is challenging, with inherent physical limitations of existing steel cable cores. Sag is one of the key physical limits on the transmission lines. Sag occurs when the current running through the conductor cable exceeds the cable's transmission capacity and over heats the conductor cable.

Currently, a new breed of overhead conductors has been introduced that enables power transmission lines to operate at higher currents and higher operating temperatures. Advanced overhead conductors have been developed to address the limitations of Aluminum Conductor Steel Reinforced (ACSR) cables. However, manufacturing and installation of these advanced overhead conductors, e.g., pultruded composite cores, and the disconnecting and de-installation of the existing transmission lines, for example, ACSR lines, increase costs with long lead time and make them less competitive.

Henceforth, there is a need for a composite reinforcement system to be installed and cured-in-place around existing power transmission lines, for example ACSR transmission lines, for increasing ampacity, and also, decreasing the sag of power transmission lines.

SUMMARY OF THE INVENTION

The present invention discloses a single or multilayer hybrid composite reinforcement system to be installed and cured-in-place around existing power transmission lines, for example ACSR transmission lines, to increase ampacity and also decrease sag of power transmission lines. Composite WiRe Wrap not only can be used to increase power capacity but also it can be used to improve reliability and resiliency of power transmission and distributions lines in severe weather conditions such as high winds or high temperature heatwaves conditions.

A hybrid composite system for existing power transmission lines is disclosed, according to one embodiment of the present invention. The hybrid composite system is configured to increase the ampacity of the power transmission lines. This system is novel, light weight, fast, and easy to install, long-lasting, reliable, environmentally friendly, and cost-effective. This hybrid composite system is configured to be installed, wrapped or applied around existing power transmission lines, for example ACSR transmission lines, in order to increase the power capacity (ampacity) and also to decrease the sag of power transmission lines.

In one embodiment, a hybrid composite reinforcement system (Composite WiRe Wrap) for power transmission lines is disclosed. In one embodiment, the hybrid composite system comprises a first layer and a second layer. The first layer and second layer are formed using a fiber reinforced resin composite material. In one embodiment, the fiber reinforced resin composite material is a basalt fiber. In one embodiment, the hybrid composite system further comprises a composite core as a structural reinforcement component, which is disposed between the first layer and second layer and is in contact with each layer on each side. Further, the first layer and the second layer are cured, thereby making the multilayer hybrid composite reinforcement system. In one embodiment, the structural reinforcement component is carbon fiber. In one embodiment, the structural reinforcement component is glass fiber. In one embodiment, the structural reinforcement component is Kevlar fiber. In one embodiment, the system is configured to wrap/apply either continuous or sectional wrap around the power transmission lines for increasing the ampacity and also reducing the sag of power transmission lines, for example ACSR transmission lines. In one embodiment, the system can be more than two layers or hybrid fabrics.

In one embodiment, the first layer and the second layer are configured to prevent direct contact between the composite core and metals, such as aluminum and steel, thereby preventing galvanic corrosion between the composite core (e.g., carbon fiber) and metals. In one embodiment, the composite core provides structural strength for the hybrid composite system. In one embodiment, the second layer, e.g., basalt fiber or glass fiber, has different properties such as, but not limited to, alkali chemical resistance, impact resistance, excellent thermal insulation, and fire resistance properties, and also has high strength rigidity at high temperatures. The first layer and the second layer could protect the system from environmental impacts, mechanical, thermal, and chemical impacts. In one embodiment, the top layer could protect the system from environmental impacts, mechanical, thermal, and chemical impacts.

The first layer, second layer, and the composite core could be weaved together as a one-piece or a one-layer system could be pre-impregnated or prepreged with high temperature resins, or alternatively pre-fabricated composite materials can be used, instead of prepreg composite materials. This has the benefit of increasing the power capacity of the transmission lines, and also allows for better control of unwanted sag in the lines.

In some embodiments, the fiber is a carbon fiber. The carbon fiber may be or include graphene fibers, graphite fibers, and combinations thereof. The carbon fiber may be or include polyacrylonitrile (PAN)-type carbon fiber, pitch type carbon fiber, or combinations thereof. The carbon fiber may be in any form, such as single layer fibers, multilayer fibers, and nanotubes, linked-particles, and combinations thereof. In these or other embodiments, the fiber further comprises an additional fibrous material, such as glass fiber, basalt fiber, natural fiber, metal fiber, polymer-based fiber such as Aramid (e.g., Kevlar, Nomex, Technora), and the like, or combinations thereof.

In some embodiments, the thermosetting and/or thermoplastic resin compromises, alternatively is as organic polymers or inorganic polymers or combinations of organic and inorganic polymers.

The first layer and the second layer, in one embodiment, act as a barrier layer and are configured to prevent galvanic corrosion between the composite core and metals.

The metals are at least any one or combination of, but not limited to, aluminum and steel. In one embodiment, the hybrid composite system is further configured to prepreg with low, medium and high temperature resins. In one embodiment, the system is further configured to prepreg with a cyanate ester resin or epoxy resin systems. In one embodiment, pre-fabricated composite materials are used in place of prepreg composite materials. The system can be further configured to decrease the sag of the power transmission lines.

In one embodiment, the pre-impregnated materials (prepregs) are reinforcement fibers into which a pre-catalyzed resin system has been impregnated by hand or machine. The resin systems react very slowly at room temperature, giving rise to working times of many days or months. Prepreg resins could only be fully cured by heating to the prescribed cure temperature. Curing agent can be activated by heat, radiation, UV light, water and even room temperature reaction. The machinery used to combine fibers with the resin ensures that laminates produced from prepreg shave more consistent and higher fiber content than could be achieved by wet lay-up techniques. Prepreg machinery is typical any kind of prepreg machine can be utilized for this purpose. This allows the use of very tough, strong resin systems that would be too high in viscosity to be impregnated by hand.

Hand lay up or wet lay-up is another option to impregnation of the fiber which can be utilized however it has less accuracy compare to machine impregnation.

In an exemplary embodiment, after installation of the prepreged hybrid composite systems around the ACSR transmission lines, they will be cured by heat generated due to high power electricity through the ACSR transmission lines. Design of the resin can lead to cure at room temperature, radiation, sunlight, UV light, water and moisture activation to start and kick the curing.

The system increases power capacity (ampacity) and decreases the sag through increasing the transmission line's mechanical strength. In one embodiment, different tests such as mechanical, bonding, electrical, thermal and durability performance tests around the transmission lines are performed on the hybrid composite system.

The system increases the service life of the existing transmission lines and improves reliability and resiliency, for example ACSR transmission lines. The hybrid composite system significantly reduces environmental, installation time and cost concerns across long distances and also upfront capital costs to build/rebuild new towers and transmission lines. The system also improves reliability through the reduced risk of sag-trip-outages and also grid resilience.

The system is flexible, and the in-field design feature provides for easy and fast installation with the minimal down time of the line during the installation of the system, which is especially important in less accessible regions. The system reduces total owner costs and maintenance and is commercially available to the power transmission and grid industry at lower costs.

One aspect of the present disclosure is directed to a hybrid composite reinforcement system for power transmission lines, comprising: a first layer and a second layer, wherein the first layer and the second layer are formed using a fiber reinforced resin composite material; and a composite core formed as a structural reinforcement component, configured to position between the first layer and second layer, thereby forming the multilayer hybrid composite reinforcement system, which is configured to either wrap or apply continuously or sectionally around the power transmission lines for increasing the ampacity of the power transmission lines.

In one embodiment, the fiber reinforced resin composite material is a basalt fiber. In another embodiment, the composite core is formed using carbon fiber or glass fiber. In one embodiment, the first layer acts as a barrier layer and prevents galvanic corrosion between the structural reinforcement component and metals. In another embodiment, the metals are at least any one of aluminum and steel. In one embodiment, the first and second layers and the composite core are configured to prepreg with high temperature resins. In another embodiment, the first and second layers and the composite core are configured to prepreg with an epoxy resin or cyanate ester resin. In one embodiment, pre-fabricated composite materials are used in place of prepreg composite materials. In one embodiment, the system is further configured to decrease the sag of the power transmission lines.

Another aspect of the present disclosure is directed to a method for forming a multilayer hybrid composite reinforcement system for power transmission lines, said method comprising the steps of: a) forming a first layer and a second layer using a fiber reinforced resin composite material comprising a basalt fiber; b) forming a composite core as a structural reinforcement component using a carbon fiber, wherein the composite core is configured to dispose between the first layer and the second layer and is in contact with each layer on each side; and c) installation and application of composite system and then curing the first layer and second layer, thereby forming the multilayer hybrid composite reinforcement system. In one embodiment, the system is configured to wrap or apply, either continuously or sectionally, around a power transmission line for increasing strength and ampacity and also decreasing the sag of the power transmission lines. In one embodiment, the first layer and the second layer act as a barrier layer and are configured to prevent galvanic corrosion between the composite core, which are in direct electrical contact with the composite core. In another embodiment, the system is configured to prepreg with high temperature resins and a cyanate ester resin. In one embodiment, pre-fabricated composite materials are used in place of prepreg composite materials. In one embodiment, the system can be more than two layers. This composite reinforcement system can be used to increase the power capacity and increase control of sag in the lines.

Another aspect of the present disclosure is directed to a multilayer hybrid composite reinforcement system for power transmission lines, comprising: a composite core as a structural reinforcement component; a fiber reinforced resin composite material surrounded over the composite core, thereby forming the composite reinforcement system, which is configured to wrap or apply or cured-in-place, either continuously or sectionally, around the power transmission lines for increasing the ampacity of the power transmission lines. In one embodiment, the system is further configured to improve reliability and resiliency of power distribution and transmission lines in severe weather conditions such as high winds or high temperature environments.

In one embodiment, the composite core is formed using carbon fiber. In another embodiment, the fiber reinforced resin composite material is a basalt fiber. In one embodiment, the fiber reinforced resin composite material acts as a barrier layer to prevent galvanic corrosion between the composite core and metals with a low longitudinal coefficient of linear thermal expansion. In one embodiment, the first layer acts as a barrier layer and is configured to prevent galvanic corrosion between the composite core and metal which are in direct electrical contact with the composite core.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

The present invention generally relates to a composite wrap, and more particularly relates to a single or multilayer hybrid composite reinforcement system to be installed and cured-in-place around existing power transmission lines, for example, ACSR transmission lines for increasing ampacity and also decreasing sag of the power transmission lines.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The term "resin" is conventionally used to describe a natural or synthetic polymer capable of being cured and/or hardened (i.e., uncured and/or unhardened). However, the term "resin" is also conventionally used to denote a natural or synthetic polymer in a cured and/or hardened state. As such, the term "resin" may be used to refer to a cured and/or hardened resin, or to an uncured and/or unhardened resin. Accordingly, it is to be understood that, as used herein, the term "resin" may refer to a cured or uncured resin, and the terms "cured resin" and "uncured resin" are used to differentiate between a particular resin in a cured or uncured state.

The resin may be a thermosetting and/or thermoplastic resin. Typically, suitable resins comprise the reaction product of a monomer and a curing agent. Such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent.

In certain instances, however, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., curesites), which may remain after curing, as understood in the art. In other instances, however, resins may be named according to a functional group present in both the monomer and the reaction product (i.e., an unreacted functional group).

Furthermore, it is to be understood that the terms "curing agent" and "cross-linking agent" can be used interchangeably. Curing agents suitable for use in forming resins are typically at least difunctional molecules that are reactive with functional groups present in a resin-forming monomer. For example, curing agents suitable for use in forming epoxy resins are typically at least difunctional molecules that are reactive with epoxide groups (i.e., comprise two or more epoxide-reactive functional groups).

It is also to be understood that the term "cured" refers to a composition or component that has undergone at least some cross-linking, e.g., at an amount of from about 50 to about 100, about 60 to about 100, about 70 to about 100, about 80 to about 100, or about 90 to about 100% of available cure sites. Additionally, the term "uncured" refers to the composition when it has undergone little or no cross-linking. However, it is to be understood that some of the available cure sites in an uncured composition may be cross-linked. Likewise, some of the available cure sites in a cured composition may remain uncross-linked. Thus, the terms "cured" and "uncured" may be understood to be functional and/or descriptive terms. For example, an uncured resin is typically characterized by solubility in organic solvents and inability to undergo liquid and/or plastic flow. In contrast, a cured resin suitable for the practice of the present invention is typically characterized by an insolubility inorganic solvent and an absence of liquid and/or plastic flow under ambient conditions.

As introduced above, the resin may be a thermosetting and/or thermoplastic resin. Examples of suitable thermosetting and/or thermoplastic resins typically include epoxy, polyester, phenol, polyamide, polyimide, polyvinyl, polyvinylester (i.e., vinylester), and polyurethane resins, cyanate ester resin, as well as modifications, and combinations thereof. Additionally, elastomers and/or rubbers can be added to or compounded with the uncured thermosetting and/or thermoplastic resin to improve certain properties such as impact strength.

Other specific examples of suitable thermosetting and/or thermoplastic resins include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenicresins; polyoxymethylenes (POM); polycarbonates (PC); polymethylene methacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxyresins; fluorinated resins, such as polytetrafluoroethylenes; thermoplastic elastomers, such aspolystyrene types, polyolefin types, polyurethane types, polyester types, polyamide types, polybutadiene types, polyisoprene types, fluorotypes, and the like; and copolymers, modifications, and combinations thereof.

In some embodiments, the resin is an epoxy resin, which may be a thermosetting and/or thermoplastic epoxy resin. In such embodiments, the epoxy resin comprises an epoxide-containing monomer (i.e., an "epoxide") and a curing agent.

Examples of suitable epoxides include aliphatic, aromatic, cyclic, acyclic, and polycyclic epoxides, and modifications and combinations thereof. The epoxide may be substituted or unsubstituted, and hydrophilic or hydrophobic. The epoxide may have an epoxy value (equiv./kg) of about 2 or greater, such as from about 2 to about 10, about 2 to about 8, about 2.5 to about 6.5, about 5 to about 10, about 2 to about 7, or about 4 to about 8. Specific examples of suitable epoxides include glycidyl ethers of biphenol A and bisphenol F, epoxy novolacs (such as epoxidized phenol formaldehydes), naphthalene epoxies, trigylcidyl adducts of p-aminophenol, tetraglycidyl amines of methylenedianiline, triglycidyl isocyanurates, hexahydro-o-phthalic acid-bis-glycidylester, hexahydro-m-phthalicacid-bis-glycidylester, hexahydro-p-phthalicacid-bis-glycidylester, and modifications and combinations thereof.

Examples of curing agents suitable for use in the epoxy resin include polyols, such as glycols, and phenols. Particular examples of phenols include biphenol, bisphenol A, bisphenol F, tetrabromobisphenol A, dihydroxydiphenyl sulfone, phenolic oligomers obtained by the reaction of above-mentioned phenols with formaldehyde, and combinations thereof. Additional examples of suitable curing agents include anhydride curing agents such as nadic methyl anhydride, methyl tetrahydrophthalic anhydride, and aromatic anhydrides such as pyromellitic dianhydride, biphenyltetracarboxylic acid dianhydride, benzophenonetetracarboxylic acid dianhydride, oxydiphthalic acid dianhydride, 4,4'-(hexafluoroisopropylidene) diphthalic acid dianhydride, naphthalene tetracarboxylic acid dianhydrides, thiophene tetracarboxylic acid dianhydrides, 3, 4, 9, 10-perylenetetracarboxylic acid dianhydrides, pyrazine tetracarboxylic acid dianhydrides, 3, 4, 7, 8-anthraquinone tetracarboxylic acid dianhydrides, oligomersor polymers obtained by the copolymerization of maleicanhydride with ethylene, isobutylene, vinylmethylether, and styrene, and combinations thereof. Further examples of suitable curing agents include maleicanhydride-graftedpolybutadiene.

In some embodiments, the resin is a polyamide resin, which may be a thermosetting and/or thermoplastic polyamide resin. Examples of suitable polyamides include those formed by the reaction of a diamine monomer and a diacid crosslinker. Specific examples of such suitable polyamides include polycaproamide (Nylon6), polyhexamethylene adipamide (Nylon66), polytetramethylene adipamide (Nylon46), polyhexamethylene sebacamide (Nylon610), polyhexamethylene dodecamide (Nylon612), polyundecaneamide, polydodecaneamide, hexamethylene adipamide/caproamide copolymer (Nylon 66/6), caproamide/hexamethylene terephthalamide, copolymer (Nylon6/6T), hexamethylene adipamide/hexamethylene terephthalamide copolymer (Nylon66/6T) hexamethylene adipamide/hexamethylene isophthalamide copolymer (Nylon 66/6I), hexamethylene adipamide/hexamethylene isophthalamide/caproamide copolymer (Nylon 66/6I/6), hexamethylene adipamide/hexamethylene terephthalamide/caproamide copolymer (Nylon66/6T/6), hexamethylene terephthalamide/hexamethylene isophthalamide copolymer (Nylon6T/6I), hexamethylene terephthalamide/dodecanamide copolymer (Nylon6T/12), hexamethylene adipamide/hexamethylene terephthalamide/hexamethylene isophthalamide copolymer (Nylon 66/6T/6I), polyxylylene adipamide, hexamethylene terephthalamide/2-methyl pentamethylene terephthalamide copolymer, polymetaxylylene diamine adipamide (NylonMXD6), polynonamethylene terephthalamide (Nylon 9T), and combinations thereof.

In certain embodiments, the resin is a phenol resin, which may be a thermosetting and/or thermoplastic phenol resin. Examples of suitable phenol resins include resins prepared by homopolymerizing or copolymerizing components containing at least a phenolic hydroxyl group, and optionally a cross-linker. In certain embodiments, the phenol resin is prepared without a cross-linker. Specific examples of suitable phenol resins include phenolic resins such as phenolnovolaks, cresolnovolaks, octylphenols, phenylphenols, naphtholnovolaks, phenolaralkyls, naphtholaralkyls, phenolresols, and the like, as well as modified phenolic resins such as alkylbenzene modified (especially, xylene modified) phenolic resins, cashew modified phenolic resins, terpene modified phenolic resins, and the like. Further examples of suitable phenol resins include 2,2-bis (4-hydroxyphenyl) propane (generally referred to as bisphenol A), 2,2-bis (4-hydroxyphenyl) methane, 1,1-bis (4-hydroxyphenyl)ethane, 1,1-bis (4-hydroxyphenyl) cyclohexane, 2,2-bis (4-hydroxy-3,5-dimethylphenyl)propane, 2,2-bis (4-hydroxy-3,5-dibromophenyl) propane, 2,2-bis (hydroxy-3-methylphenyl) propane, bis (4-hydroxyphenyl) sulfide, bis (4-hydroxyphenyl) sulfone, hydroquinone, resorcinol, 4,6-dimethyl-2, 4,6-tri (4-hydroxyphenyl) heptene, 2,4,6-dimethyl-2,4,6-tri (4-hydroxyphenyl) heptane, 2,6-dimethyl-2,4,6-tri (4-hydroxyphenyl) heptene, 1,3,5-tri (4-hydroxyphenyl) benzene, 1,1,1-tri (4-hydroxyphenyl) ethane, 3,3-bis (4-hydroxyaryl) oxyindole, 5-chloro-3,3-bis (4-hydroxyaryl) oxyindole, 5,7-dichloro-3,3-bis (4-hydroxyaryl) oxyindole, 5-brome-3,3-bis (4-hydroxyaryl) oxyindole, and combinations thereof.

In particular embodiments, the resin is a polyester resin, which may be a thermosetting and/or thermoplastic polyester resin. Examples of suitable polyester resins include polycondensation products of a polycarboxylic acid and a polyol, ring-opened polymers of a cyclic lactone, polycondensation products of a hydroxycarboxylic acid, and polycondensation products of a dibasic acid and a polyol. It is to be appreciated that the term "polyol" as used herein is meant to describe a molecule with at least two—OH functional groups (e.g., alcohol, hydroxy and/or hydroxyl functional groups). Particular examples of suitable polyols include polyetherpolyols, diols such as glycols, triols such as glycerine, 1,2,6-hexanetriol, trimethoxypropane (TMP), and triethoxypropane (TEP), sugar alcohols such as erythritol, lactitol, maltitol, mannitol, sorbitol, and xylitol, and the like, as well as combinations and modifications thereof. Other suitable polyols include biopolyols such as castoroil, hydroxylated fatty esters (e.g., hydroxylated glycerides), hydroxylated fatty acids, and the like, as well as modifications and/or combinations thereof. Specific examples of suitable polyester resins include polyethylene terephthalate resins, polypropylene terephthalate resins, polytrimethylene terephthalate resins, polybutylene terephthalate resins, polyethylene naphthalate resins, polybutylene naphthalate resins, polycyclohexanedimethylene terephthalate resins, polyethylene-1,2-bis(phenoxy) ethane-4,4'-dicarboxylate resins, polyethylene-1,2-bis (phenoxy) ethane-4,4'-dicarboxylate resins, as well as copolymer polyesters such as polyethylene isophthalate/terephthalate resins, polybutylene terephthalate/isophthalate resins, polybutylene terephthalate/decanedicarboxyate resins, and polycyclohexanedimethylene terephthalate/isophthalateresins, and combinations thereof.

In some embodiments, the resin is a polyvinyl resin, which may be a thermosetting and/or thermoplastic polyvinyl resin. Examples of suitable polyvinyl resins include polymerization products of molecules comprising vinyl, vinylidene, and/or vinylene functional groups. Specific examples of polyvinyl resins include those formed from vinylhalides such as vinyl chloride, vinylarenes such as styrene, vinylesters, and the like, as well as combinations and/or modifications thereof. Specific examples of suitable polyvinyl resins include polyvinylester resins, such as homopolymer, copolymer, and di-, tri-, and/or poly-block polymer products of vinylesters. Examples of suitable vinylesters include vinylalkanoates such as vinylacetates, vinyl stearates, vinyl decanoates, vinyl valerates, vinyl pivalate, and the like, vinylbenzoates, vinyl formates, vinyl cinnamates, and the like, as well as combinations and/or modifications thereof.

In certain embodiments, the resin is a polyurethane resin, which may be a thermosetting and/or thermoplastic polyurethane resin. Examples of suitable polyurethanes include condensation products of a polyisocyanate and a polyol, such as those polyols described herein. Examples of suitable polyisocyanates include ediisocyanates such as aromatic diisocyanates (e.g., toluene diisocyanate (TDI), methylene diphenyl diisocyanate (MDI), and naphthalene diisocyanate (NDI)), alkylisocyanates (e.g., hexamethylene diisocyanate (HDI) and methylenebis-cyclohexyl isocyanate (HMDI)), and aliphatic diisocyanates (e.g., isophorone diisocyanate (IPDI)), and the like, as well as combinations, modifications, and self-polymerization products thereof.

The fiber comprises any fibrous material, such as carbon fiber, fiberglass, basalt fiber, natural fiber, metal fiber, polymer-based fibers such as aramid fiber (e.g., Kevlar, Nomex, Technora), and combinations thereof. It is to be appreciated that the term "fiber" can denote a single fiber and/or a plurality of fibers. Herein, use of the term "fiber" denotes one or more individual fibers, which can be independently selected based on composition, size, length, and the like, or combinations thereof. For clarity and consistency, reference to "the fiber" is made herein, which is not intended to refer to just one fiber, but to any one fiber, which may be independently selected. The description below may relate to a single fiber, or all of the fibers, utilized.

In some embodiments, the fiber is a carbon fiber. The carbon fiber may be or include graphene fibers, graphite fibers, and combinations thereof. The carbon fiber may be or include polyacrylonitrile (PAN)-type carbon fiber, pitch type carbon fiber, or combinations thereof. The carbon fiber may be in any form, such as single layer fibers, multilayer fibers, nanotubes, linked particles, and combinations thereof. In these or other embodiments, the fiber further comprises an additional fibrous material, such as glass fiber, basalt fiber, natural fiber, metal fiber, polymer-based fiber such as aramid fiber (e.g., Kevlar, Nomex, Technora), and the like, or combinations thereof.

Figure 1:
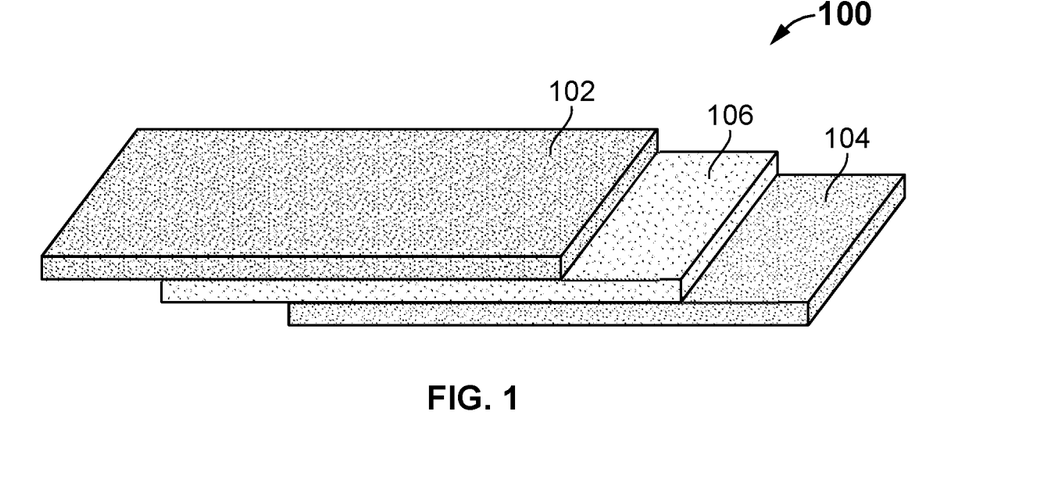
FIG. 1 illustrates a multilayer hybrid composite reinforcement system for existing power transmission lines, according to one embodiment.

Referring to FIG. 1, a multilayer hybrid composite reinforcement system 100 for existing power transmission lines is disclosed according to one embodiment of the present invention. In one embodiment, the system 100 is configured to increase the ampacity of the power transmission lines. There is a need for the present system because, in one embodiment, the system 100 is a novel, lightweight, easy to install, long-lasting, reliable, environmentally friendly, and cost-effective system. The system 100 is configured to be installed or applied around the existing power transmission lines, for example, ACSR transmission lines to increase the power capacity (ampacity) and also decrease the sag of the power transmission lines.

In one embodiment, the system 100 comprises a first layer 102 and a second layer 104. In one embodiment, the first layer 102 and second layer 104 are formed using a fiber reinforced resin composite material. In one embodiment, the fiber reinforced resin composite material is a basalt fiber. Any organic and organic fiber can be served the purpose such as Kevlar, carbon fiber, basalt fiber, and glass fiber. In one embodiment, the system can be more than two layers.

In another embodiment, the system 100 further comprises a composite core 106 as a structural reinforcement component using a carbon fiber, which is disposed between the first layer 102 and the second layer 104 and is in contact with each layer on each side. Any organic and organic fiber can be serving the purpose such as Kevlar, carbon fiber, basalt fiber, and glass fiber. Further, the first layer 102 and the second layer 104 are cured, thereby making the multilayer hybrid composite reinforcement system 100. In one embodiment, the structural reinforcement component is carbon fiber. In one embodiment, the system 100 is configured to be wrapped or applied, either continuously or sectionally, around the power transmission lines. This then has the effect of increasing the ampacity and concurrently also reducing the sag of the power transmission lines, for example ACSR transmission lines.

In one embodiment, the first layer 102 and the second layer 104 are configured to prevent direct contact between the composite core, i.e., carbon fiber 106, and metals such as aluminum and steel, which are in electrical contact with the composite core 106. By configuring the system this way, galvanic corrosion is prevented between the carbon fiber and metals having the low longitudinal coefficient of linear thermal expansion. In one embodiment, the composite core, i.e., carbon fiber 106, provides structural strength for the system 100. In one embodiment, the second layer, i.e., basalt fiber 104, has different properties such as, but not limited to, alkali chemical resistance, impact resistance, excellent thermal insulation, fire resistance properties, and also has high strength and rigidity at high temperatures.

The first layer 102 and the second layer 104 could protect the system 100 from environmental impacts, mechanical, thermal, and chemical impacts. The first layer 102, second layer 104, and the composite core 106 could be weaved together as a one-piece object or one layer system and could be pre-impregnated or prepreged with high temperature resins. Such resins are listed supra and would be understood to those of skilled in the art. Any type of resin as a matrix can be used such as epoxy resin, phenolic resin, cyanate ester resins.

In one embodiment, the first layer 102 and the second layer 104 act as a barrier layer to prevent galvanic corrosion between the composite core 106 and metals having a low longitudinal coefficient of linear thermal expansion, which are in electrical contact with the composite core 106. The metals are at least any one or combination of, but not limited to, aluminum or/and steel.

In one embodiment, the system 100 is further configured to prepreg with high temperature resins. In one embodiment, the system 100 is further configured to prepreg with a high temperature resin. In one embodiment, pre-fabricated composite materials are used in place of prepreg composite materials.

The system 100 is further configured to decrease the sag of the power transmission lines by increasing the strength and ampacity of the lines.

The pre-impregnated materials (prepregs) may be reinforcement fibers into which a pre-catalyzed resin system has been impregnated by a machine. The resin systems react slowly at room temperature, giving rise to working times of many days or months. Prepreg resins could be fully cured by heating to the prescribed cure temperature. Curing agent can be done by many activation mechanisms such and high temperature, room temperature, radiation, sun light, water, and UV activations.

The accuracy of the machinery used to combine fibers with the resin ensures that laminates produced from prepregs have more consistent and higher fiber content than could be achieved by wet lay-up techniques. This allows the use of very tough, strong resins that would be too viscous to be impregnated by hand.

In an exemplary embodiment, after installation of the prepreged hybrid composite system 100, for example around the ACSR transmission lines, the system can be cured by heat generated due to high power electricity through the transition lines (e.g., ACSR transmission lines).

The system 100 could increase power capacity (ampacity) and decrease the sag through increasing the transmission line's mechanical strength. In one embodiment, different tests such as mechanical, bonding, electrical, thermal and durability performance tests around the transmission lines are performed on the hybrid composite system 100.

The system 100 increases the service life of the existing transmission lines, for example, ACSR transmission lines. The system 100 significantly reduces environmental and cost concerns, especially when considering transmission lines across long distances. Using the presently disclosed system, there is added benefit as described infra at significantly reduced cost, including the upfront capital costs to build or rebuild new towers and transmission lines. The system 100 improves reliability through the reduced risk of sag-trip-outages and also grid resilience. The system 100 is flexible and the in-field design provides easy and fast installation with minimal transmission line down time during installation of the system 100, specifically for less accessible regions. The system 100 reduces total owner costs and maintenance, and is available for implementation by the power transmission and grid industry to achieve better efficiency and results at minimal cost.

Figure 2:
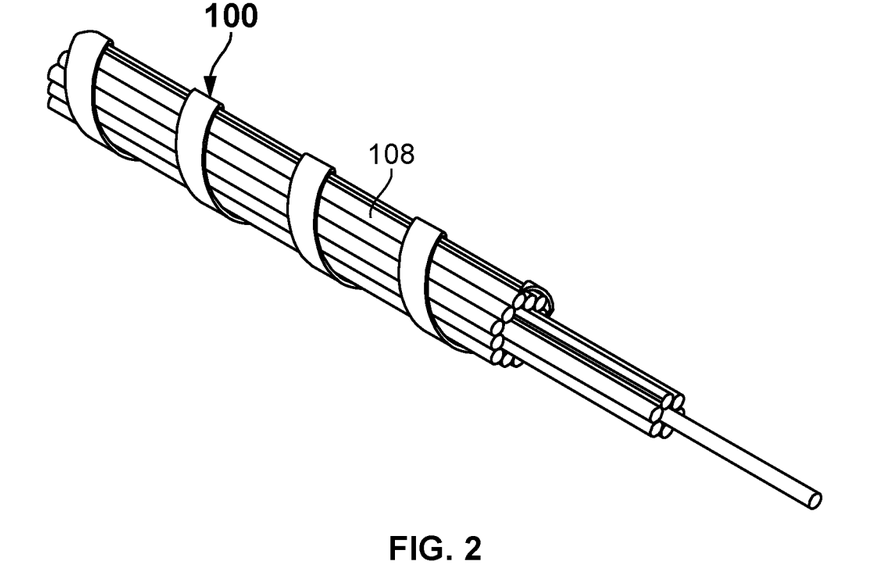
FIG. 2 illustrates a hybrid composite system in the form of a wire is wrapped around the power transmission line, for example, ACSR transmission line, according to one embodiment.

Referring to FIG. 2, the hybrid composite system 100 in the form of a wire or tape is wrapped around the power transmission line, for example, ACSR transmission line in one embodiment is disclosed. In one embodiment, the hybrid composite system 100 in the form of a wire or tape could be continuously wrapped around the power transmission line 108, for example, ACSR transmission line for increasing the ampacity of the power transmission lines 108.

Figure 3:
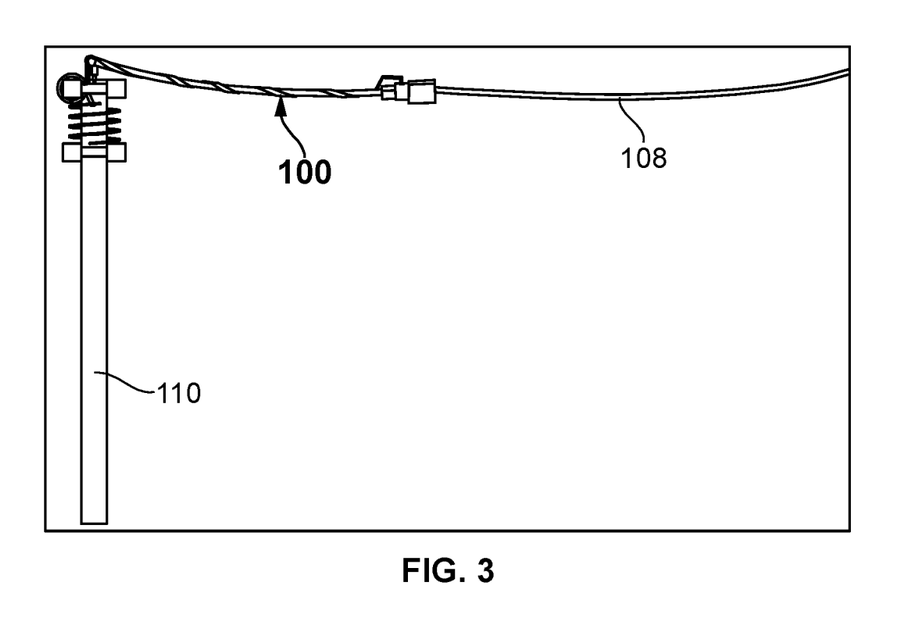
FIGS. 3-4 illustrate a process of wrapping the hybrid composite system in the form of a wire around the power transmission line, for example, ACSR transmission line using an innovative robotic system, according to one embodiment.
Figure 4:
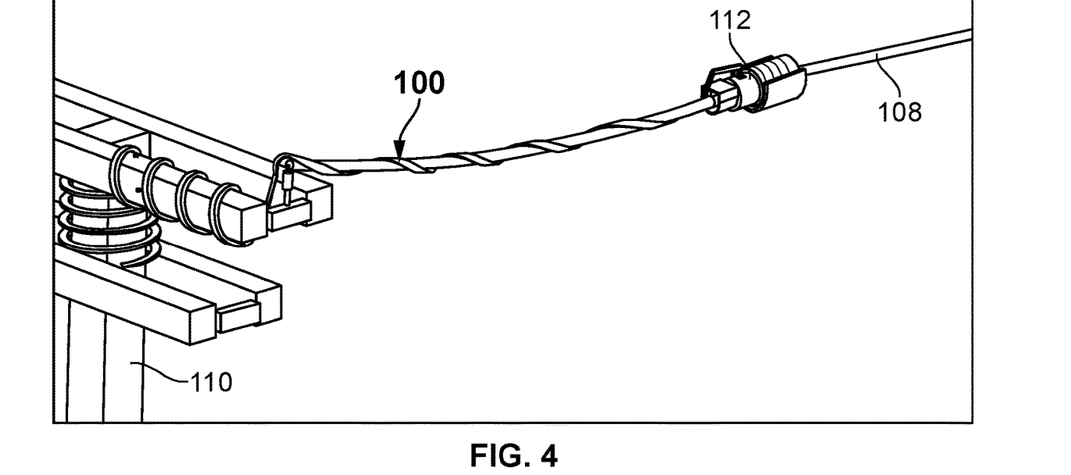

Referring to FIGS. 3-4, a process of wrapping the hybrid composite system 100 in the form of a wire or tape around the power transmission line 108, for example, ACSR transmission line in one embodiment is disclosed. In one embodiment, the hybrid composite system 100 in the form of a wire or tape could be wrapped around the power transmission line 108, for example, ACSR transmission line using an innovative robotic system 112. In one embodiment, the innovative robotic system 112 is configured to safely and automatically wrap the hybrid composite system 100 in the form of a wire or tape around the power transmission line 108, for example, ACSR transmission line, wherein the power transmission line 108 could be supported on a wooden electrical support 110.

Figure 5:
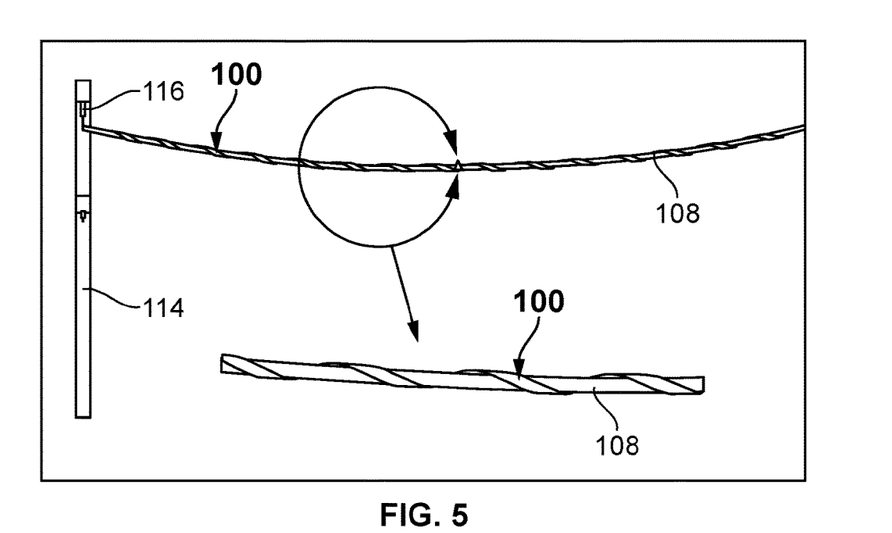
FIG. 5 illustrates the power transmission line, for example ACSR transmission line wrapped with the hybrid composite system in the form of a wire (carbon composite) for a concrete electric support with details, according to one embodiment.

Referring to FIG. 5, the power transmission line 108, for example ACSR transmission line is wrapped with the hybrid composite system 100 in the form of a wire or tape (carbon composite) in one embodiment is disclosed. In one embodiment, the power transmission line 108, for example, ACSR transmission line is continuously wrapped with the hybrid composite system 100 in the form of a wire or tape (carbon composite) for providing strength to the power transmission line 108. The hybrid composite system 100 in the form of a wire (carbon composite) also increases ampacity and decreases the sag of the power transmission line 108. In one embodiment, the power transmission line 108, for example, ACSR transmission line is supported on a concrete electric support 114 using insulators 116.

Figure 6:
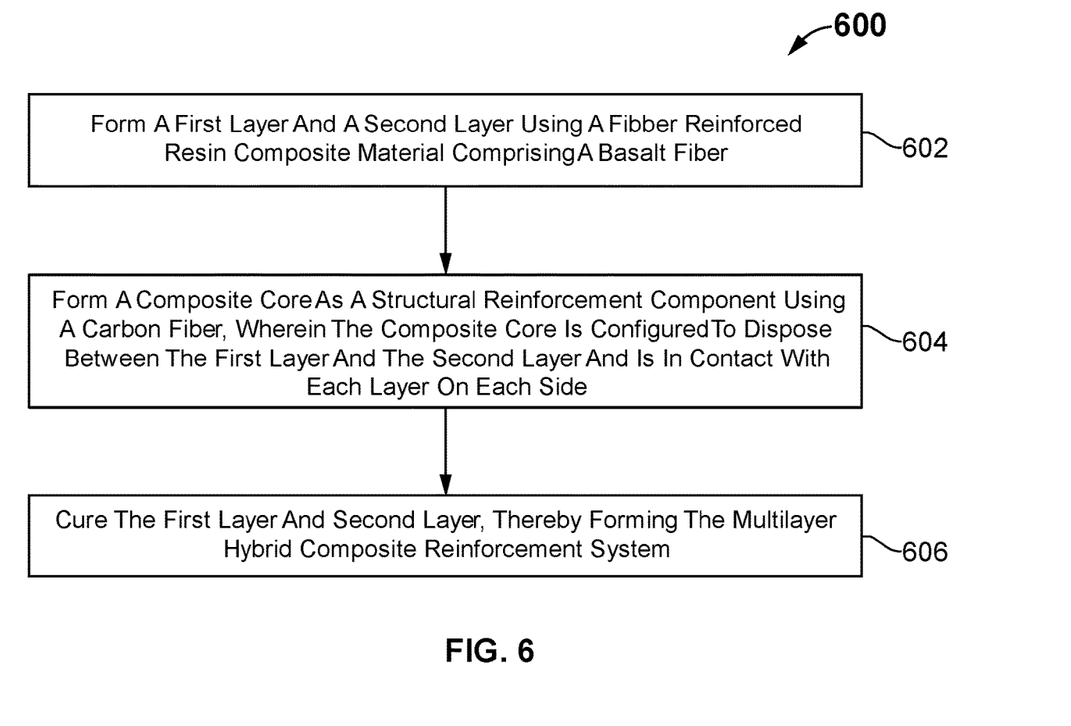
FIG. 6 illustrates a flowchart of a method for forming the multilayer hybrid composite reinforcement system, according to one embodiment.

Referring to FIG. 6, a flowchart of a method 600 for forming the multilayer hybrid composite reinforcement system for power transmission lines is disclosed. At step 602, the first layer 102 and the second layer 104 are formed using a fiber reinforced resin composite material comprising a basalt fiber. At step 604, the composite core 106 is formed as a structural reinforcement component using a carbon fiber. The composite core 106 is configured to dispose between the first layer 102 and the second layer 104 and is in contact with each layer on each side. Further, at step 606, the first layer 102 and second layer 104 are installed and cured, thereby forming the multilayer hybrid composite reinforcement system 100.

Figure 7:
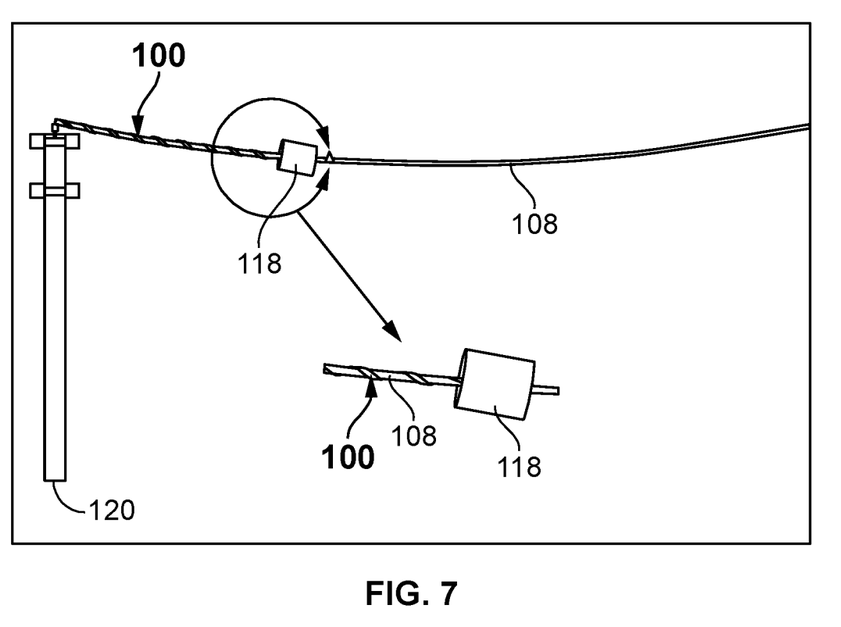
FIG. 7 illustrates another example of a process for wrapping the hybrid composite system around the power transmission line, for example, ACSR transmission line using a composite applicator, according to one embodiment.

Referring to FIG. 7, another example of a process for wrapping or applying the hybrid composite system 100 around the power transmission line 108, for example, ACSR transmission line using a composite applicator 118 is disclosed. In one embodiment, the hybrid composite system 100 could be wrapped or applied around the power transmission line 108, for example, ACSR transmission line using the composite applicator 118. In one embodiment, the composite applicator 118 is configured to safely and automatically apply the hybrid composite system 100 around the power transmission line 108, for example, ACSR transmission line, wherein the power transmission line 108 could be supported on a wooden electrical support 120.

Figure 8:
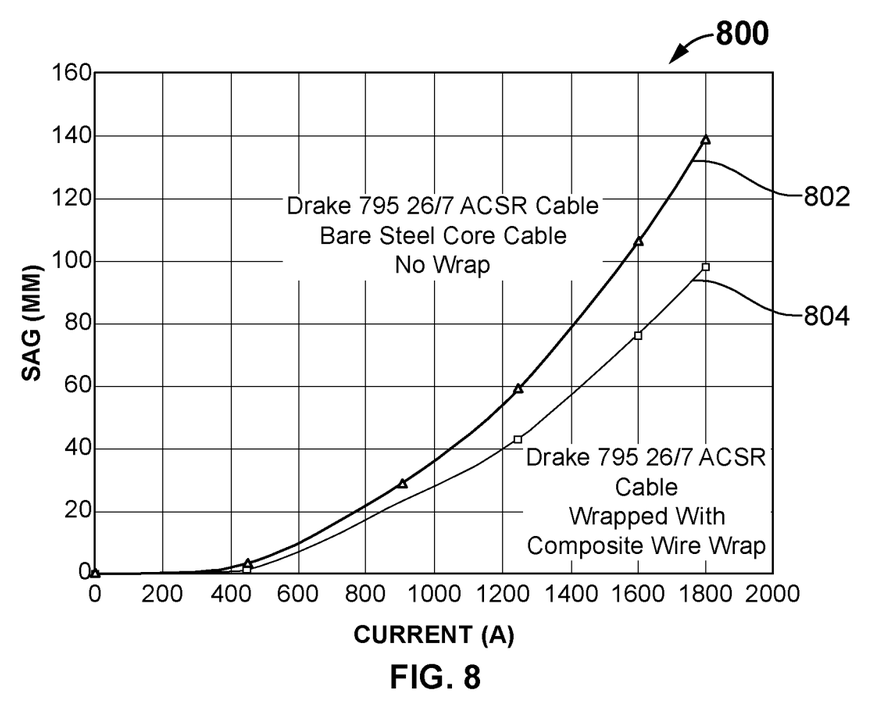
FIG. 8 illustrates a graph displays sag of the power transmission lines unwrapped and wrapped with the hybrid composite system versus the current flow in the power transmission lines, according to one embodiment.

Referring to FIG. 8, a graph 800 displays sag of the power transmission lines unwrapped and wrapped with the hybrid composite system 100 versus the current flow in the power transmission lines is disclosed. The test set up uses a Drake 795 26/7 ACSR cable of about 30 feet. The curve 802 represents a Drake 795 26/7 ACSR cable (bare steel core cable), which is not wrapped by the composite system 100 and the curve 804 represents a Drake 795 26/7 ACSR cable (bare steel core cable), which is wrapped with about 3 inches of hybrid composite system 100 (composite wire). The test results exemplarily illustrate that the drake 795 26/7 ACSR cable (bare steel core cable) with no wrap has comparatively higher sag than the drake 795 26/7 ACSR cable wrapped with the hybrid composite system 100 (composite wire). The Drake 795 26/7 ACSR line wrapped with the hybrid composite system 100 (composite wire) reduces the sag by 30% with the same amount of current (A).

During the test, the current (A) of different ranges including, but not limited to, 0 A, 450 A, 908 A, 1250 A, 1600 A, and 1800 A is applied in a controlled manner to the drake 795 ACSR cable to measure the amount of reduction of sag (mm). Based on the supplied current (A), the cable's sag (mm) is minimized for the Drake 795 26/7 ACSR cable (bare steel core cable) wrapped with the hybrid composite system 100 (composite wire). The sag (mm) of the Drake 795 26/7 ACSR cable (bare steel core cable) with wrap about 0 mm, 2 mm, 21 mm, 41 mm, 73 mm, and 98 mm with respective to the supplied current (A) values of about 0 A, 450 A, 908 A, 1250 A, and 1800 A.

| Drake 795 ACSR Line without the composite system (Composite WiRe Wrap) | | | |
| --- | --- | --- | --- |
| Current (A) | Temperature (C) | Voltage (V) | Sag (mm) |
| 0 | 20 | 0 | 0 |
| 450 | 25 | 0.47 | 2 |
| 908 | 63 | 0.96 | 21 |
| 1250 | 107 | 1.48 | 41 |
| 1600 | 178 | 1.99 | 73 |
| 1800 | 223 | 2.53 | 98 |

| Drake 795 ACSR Line Wrapped with Composite WiRe Wrap | | | |
| --- | --- | --- | --- |
| Current (A) | Temperature (C) | Voltage (V) | Sag (mm) |
| 0 | 20 | 0 | 0 |
| 450 | 26 | 0.31 | 3 |
| 908 | 70 | 0.79 | 29 |
| 1250 | 120 | 1.24 | 59 |
| 1600 | 192 | 1.9 | 106 |
| 1800 | 247 | 2.41 | 139 |

Figure 9:
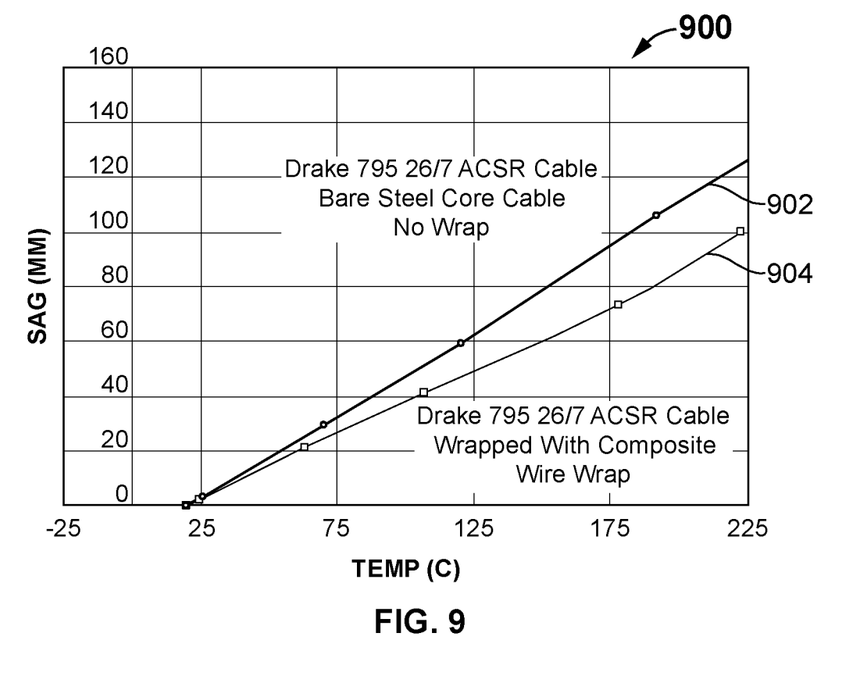
FIG. 9 illustrates a graph displays sag of the power transmission lines unwrapped and wrapped with the hybrid composite system versus temperature, according to one embodiment.

Referring to FIG. 9, a graph 900 displays sag of the power transmission lines unwrapped and wrapped with the hybrid composite system 100 versus temperature is disclosed. The test set up uses a Drake 795 26/7 ACSR cable of about 30 feet. The curve 902 represents a Drake 795 26/7 ACSR cable (bare steel core cable), which is not wrapped by the composite system 100 and the curve 904 represents a Drake 795 26/7 ACSR cable (bare steel core cable), which is wrapped with about 3 inches of hybrid composite system 100 (composite wire). The test results exemplarily illustrate that the drake 795 26/7 ACSR cable (bare steel core cable) with no wrap has comparatively higher sag than the drake 795 26/7 ACSR cable wrapped with the hybrid composite system 100 (composite wire). The Drake 795 26/7 ACSR line wrapped with the hybrid composite system 100 (composite wire) reduces the sag by 30% with the same amount of temperature (° C.).

The other objective is to fabricate the hybrid composite system 100 using carbon fiber and basalt fibers, and then prepreg them with high temperature resins. The system 100 is successfully fabricated and implemented from the analysis considering 3 layers of basalt/carbon/basalt fibers and impregnated the system 100 to more than 250° C. operating temperature. In one embodiment, the first layer 102 has a weight of about, but not limited to, 1 up to 20 oz./yd$^2$ to prevent direct contact between the structural reinforcement component, i.e., carbon fiber 106, and metals to mitigate any galvanic corrosions. In one embodiment, the structural reinforcement component 106 has a weight range from about, but not limited to, multiaxial, 1 up to 30 oz/yd$^2$.

The composite core as a structural reinforcement component 106 provides structural strength and integrity for the hybrid composite system 100. In one embodiment, the second layer, i.e., basalt fiber 104, has a weight of about, but not limited to, 1 up to 30 oz./yd2.

The basalt fiber exhibited better alkali chemical resistance, impact resistance, thermal insulation, and fire resistance properties, and are shown to be operable at very high service temperatures to protect the composite core 106 from environmental, mechanical, thermal and chemical impacts. In one embodiment, the hybrid composite system 100 is configured to prepreg with a cyanate ester resin. The cyanate ester resin provides a high temperature cyanate ester prepregs for making structural composites, offering superior mechanical performance at operating temperatures up to 600° C.). (316°.

The other objective is to validate the design of the hybrid composite system 100. However, different tests include mechanical, bonding, electrical, thermal, and durability tests that are performed to evaluate the performance for achieving tensile strength to double the power capacity.

In an exemplary embodiment, the installation of the hybrid composite system 100 is disclosed. In one scenario I, the following steps were carried out: 1) 2-inches width hybrid composite system at specific length depends on the distance between supporting towers is rolled around a roller and it is held on top of the tower (tower A); end of the system 100 is connected to the installation rope and another end of the installation rope goes to another tower (tower B); 3) installation rope is rolled and pulled to the direction of tower B; 4) pulls the hybrid composite system from tower A to tower B, and the system 100 is wrapped around the ACSR transmission line.

Rotational pulling of the installation rope and the frequency of rotation determines and controls the length and orientation, sectional or extent of wrapping, of hybrid composite system 100 around the ACSR transmission line. After reaching the hybrid composite system 100 from tower A to tower B, both ends are wrapped around the towers A and B. Thereafter, the system 100 is cured, either at room temperature or by the generated heat due to flowing high current in the ACSR power transmission lines.

In a second scenario II, the following steps were carried out: 1) 1-inches width of composite system 100 at specific length depends on the distance between supporting towers is rolled and it is held on top of the tower (tower A); 2) light weight installation roller pulls and moves the system 100 from tower A to tower B, and along moving from tower A to tower B and it rotates around the ACSR transmission line; 3) when the roller reaches to tower B, both ends of the system 100 are wrapped around both towers. Thereafter, the hybrid composite system 100 is cured, either at a room temperature or by the generated heat due to flowing high currents in the ACSR power transmission line.

In one embodiment, an installation inspection procedure and quality control/quality assurance manual are provided for the installer and engineers. The manual ensures adequate in-field installation and makes sure that installed hybrid composite systems meet the design specification, will develop inspection procedure and quality control/quality assurance procedure for installers and inspectors. The QA/QC plan will include a specific procedure for personnel safety, tracking and an inspection of all hybrid composite components prior installation, an inspection of all ACSR lines, and an inspection of the working progress to ensure conformity to the specification, test samples, an inspection of all completed work, repair of any defective work and clean-up.

The advantages of the present invention are disclosed as follows. The hybrid composite system 100 increases the power capacity (ampacity) and reduces the sag of the power transmission lines, for example, ACSR transmission lines, and also increases the service life of aged power transmission lines. The hybrid composite system 100 significantly reduces environmental and cost concerns across long distances and also significantly reduces the upfront capital costs to build/rebuild new towers and transmission lines. The hybrid composite system 100 improves reliability through the reduced risk of sag trip outages and power grid resilience.

The hybrid composite system 100 is flexible and provides for in-field design and implementation, upon needed ampacity. The hybrid composite system 100 provides easy and fast installation with the minimal downtime of the line, providing a great benefit to power companies. This feature, plus the easier maintenance is especially relevant for regions that are less accessible. The hybrid composite system 100 significantly reduces the total ownership costs.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A hybrid composite reinforcement system (Composite WiRe Wrap) for power transmission lines, comprising:
   a first layer and a second layer, wherein the first layer and the second layer are formed using a fiber reinforced resin composite material, wherein the fiber reinforced resin composite material is a carbon/glass/basalt fiber, and
   a composite core formed as a structural reinforcement component, configured to position between the first layer and second layer, thereby forming the multilayer hybrid composite reinforcement system, which is configured to wrap or apply, continuously or sectionally, around the power transmission lines for increasing the ampacity of the power transmission lines, wherein the first layer acts as a barrier layer and is configured to prevent galvanic corrosion between the composite core and metal which are in direct electrical contact with the composite core and wherein the first and second layers, and
the composite core are configured to prepreg with high temperature resins.

2. The system of claim 1, wherein the composite core is formed using carbon fiber or glass fiber.

3. The system of claim 1, wherein the metals are at least any one of aluminum and steel.

4. The system of claim 1, wherein the first and second layers and the composite core are configured to prepreg with an epoxy resin or cyanate ester resin.

5. The system of claim 1, wherein the system is further configured to decrease the sag of the power transmission lines.

6. The system of claim 1, wherein the system is further configured to improve reliability and resiliency of power distribution and transmission lines in severe weather conditions such as high winds or high temperature environments.

7. A multilayer hybrid composite reinforcement system for power transmission lines, comprising:
   a composite core as a structural reinforcement component;
   a fiber reinforced resin composite material made of a carbon/glass/basalt fiber, surrounded over the composite core, thereby forming the composite reinforcement system, which is configured to wrap or apply, either continuously or sectionally, around the power transmission lines for increasing the ampacity of the power transmission lines, wherein the fiber reinforced resin composite material acts as a barrier layer and is configured to prevent galvanic corrosion between the composite core and metal which are in direct electrical contact with the composite core, and wherein the first and second layers, and the composite core are configured to prepreg with high temperature resins.

8. The system of claim 7, wherein the composite core is formed using a carbon fiber.

9. The system of claim 7, wherein the metals are at least any one of aluminum and steel.

10. The system of claim 7, is configured to prepreg with a cyanate ester resin.

11. The system of claim 7, is further configured to decrease the sag of the power transmission lines.

12. The system of claim 7, wherein the system is further configured to improve reliability and resiliency of power distribution and transmission lines in severe weather conditions such as high winds or high temperature environments.

13. A method for forming a multilayer hybrid composite reinforcement system for power transmission lines, said method comprising the steps of:
   forming a first layer and a second layer using a fiber reinforced resin composite material made of a carbon/glass/basalt fiber;
   forming a composite core as a structural reinforcement component using a carbon fiber, wherein the composite core is configured to dispose between the first layer and the
   second layer and is in contact with each layer on each side, wherein the first layer acts as a barrier layer and is configured to prevent galvanic corrosion between the composite core and metal which are in direct electrically contact with the composite core, and wherein the first and second layers, and the composite core are configured to prepreg with a cyanate ester resin; and
   installing and curing the first layer and second layer, thereby forming the multilayer hybrid composite reinforcement system.

14. The method of claim 13, is configured to wrap or apply, either continuously or sectionally, around a power transmission line for increasing strength and ampacity and also decreasing the sag of the power transmission lines.

* * * * *